(12) United States Patent
More et al.

(10) Patent No.: US 8,352,114 B2
(45) Date of Patent: Jan. 8, 2013

(54) METHOD AND APPARATUS FOR DOCKING A ROBOTIC DEVICE WITH A CHARGING STATION

(75) Inventors: Grinnell More, Nashua, NH (US); Timothy Root, Nashua, NH (US); David Johnston, Westford, MA (US); Barret Wolber, Franklin, MA (US)

(73) Assignee: VGO Communications, Inc, Nashua, NH (US)

( * ) Notice: Subject to any disclaimer, the term of this patent is extended or adjusted under 35 U.S.C. 154(b) by 0 days.

(21) Appl. No.: 13/112,537

(22) Filed: May 20, 2011

(65) Prior Publication Data

US 2012/0296511 A1  Nov. 22, 2012

(51) Int. Cl.
*G01C 22/00* (2006.01)
*G05D 1/00* (2006.01)
(52) U.S. Cl. .......................................... 701/26; 320/109
(58) Field of Classification Search .................... 701/26; 320/107, 109; 700/245, 6; 318/568.12
See application file for complete search history.

(56) References Cited

U.S. PATENT DOCUMENTS

| | | | |
|---|---|---|---|
| 5,787,545 A * | 8/1998 | Colens ............................ 15/319 |
| 6,389,329 B1 * | 5/2002 | Colens ........................... 700/262 |
| 6,532,404 B2 * | 3/2003 | Colens ........................... 700/262 |
| 6,764,373 B1 * | 7/2004 | Osawa et al. ................... 446/175 |
| 7,053,578 B2 * | 5/2006 | Diehl et al. ............... 318/568.12 |
| 2004/0158357 A1 * | 8/2004 | Lee et al. ........................ 700/258 |
| 2005/0156562 A1 * | 7/2005 | Cohen et al. ................... 320/107 |
| 2007/0267998 A1 * | 11/2007 | Cohen et al. ................... 320/109 |
| 2008/0007203 A1 * | 1/2008 | Cohen et al. ................... 320/104 |
| 2008/0065266 A1 * | 3/2008 | Kim ................................ 700/245 |
| 2008/0174268 A1 * | 7/2008 | Koo et al. ....................... 320/109 |
| 2010/0010672 A1 * | 1/2010 | Wang et al. .................... 700/259 |

* cited by examiner

*Primary Examiner* — Thomas Black
*Assistant Examiner* — Tyler Paige
(74) *Attorney, Agent, or Firm* — Robert C. Schuler

(57) ABSTRACT

A docking system includes a mobile robotic device and a charging station to which the robotic device is to dock. The robotic device is comprised of sensors to capture a homing signal emitted by the charging station, docking logic that processes the homing signal so that it can be used to control the movements of the robotic device towards and dock with the charging station, and it is comprised of a mechanism for receiving a cylindrical charging post. The charging station is comprised of a circular platform in the center of which is located the charging post that is generally cylindrical in shape. The charging post includes a charging contact, ground contacts and an IR emitter. The geometry of the receiver mechanism elements and the shape of the charging post and geometry of the charging station generally permits the robotic device to approach the charging station and to dock with the charging station from any angle.

21 Claims, 15 Drawing Sheets

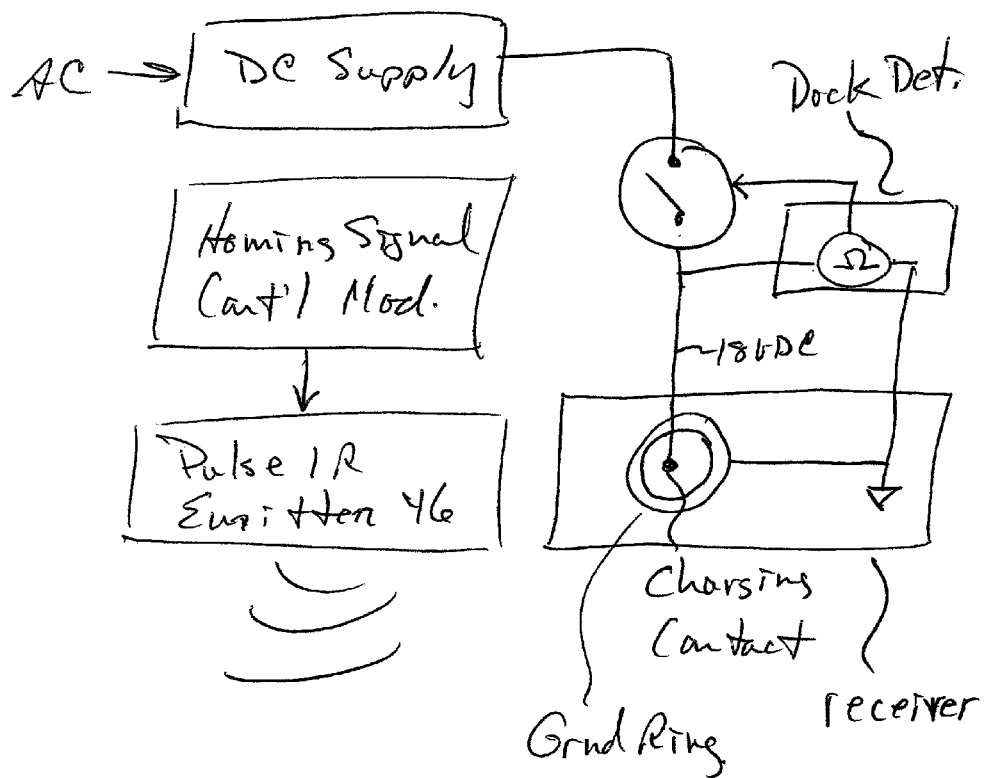

Robotic Der. Docking Mechanism

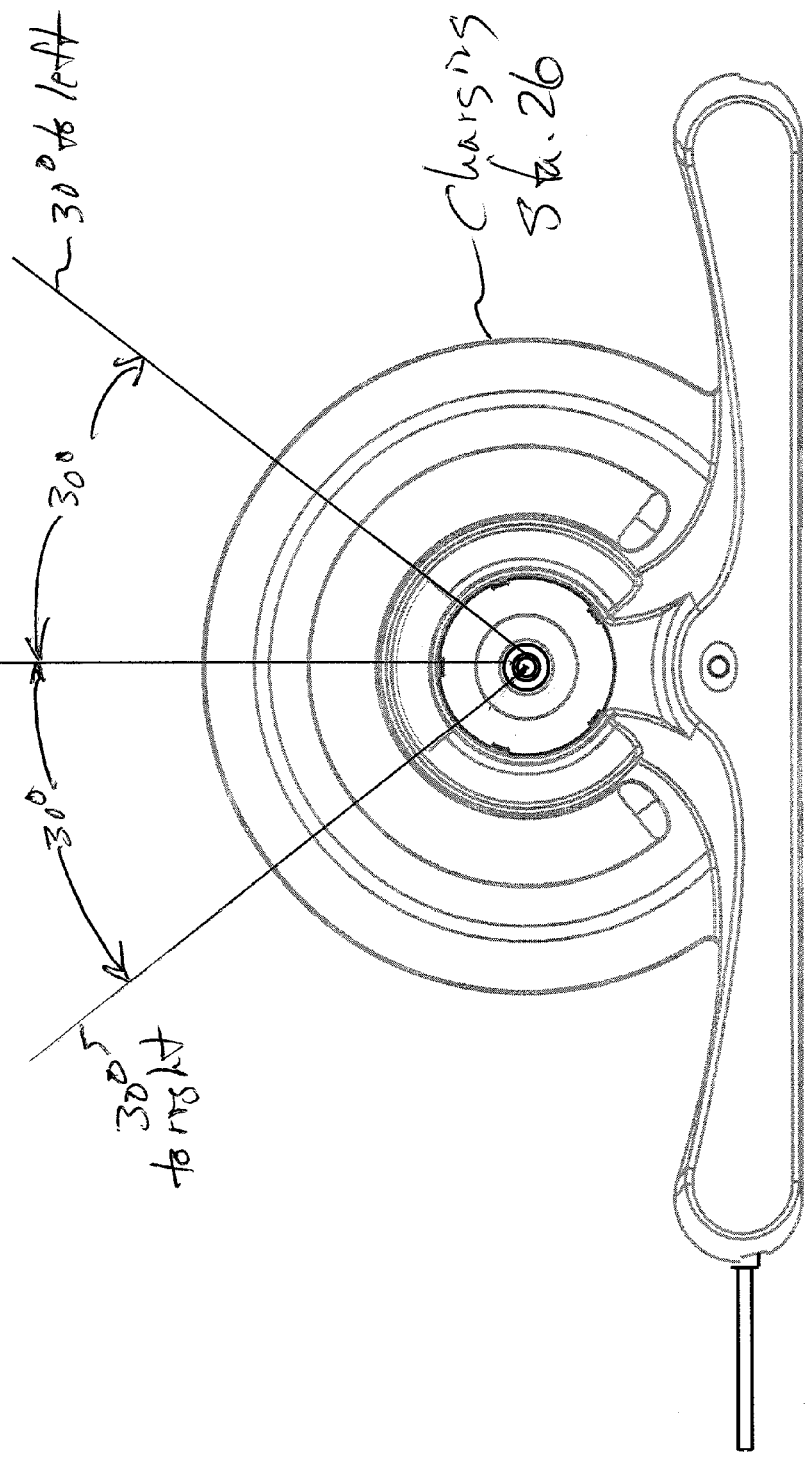
FIG. 1A1

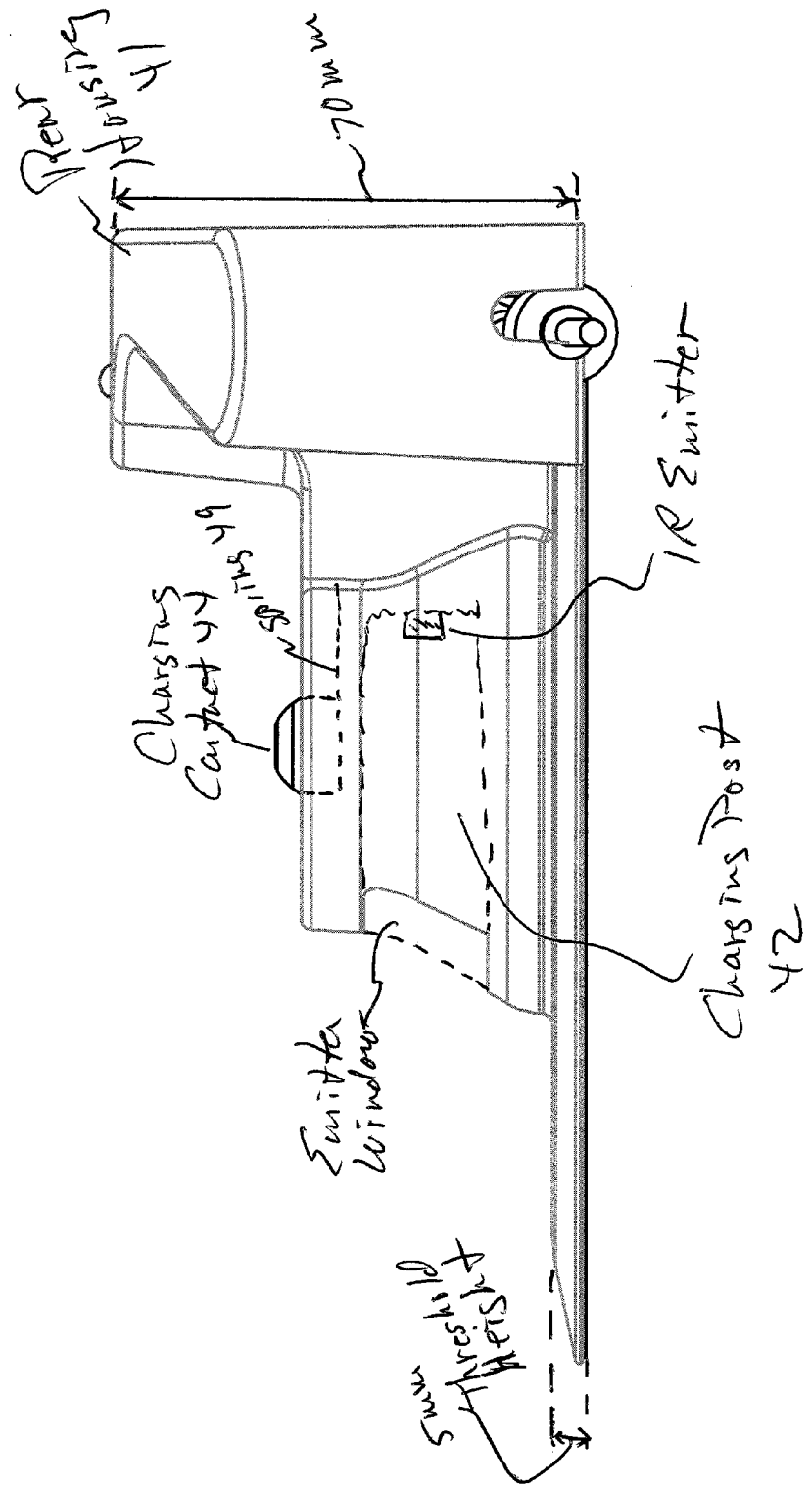

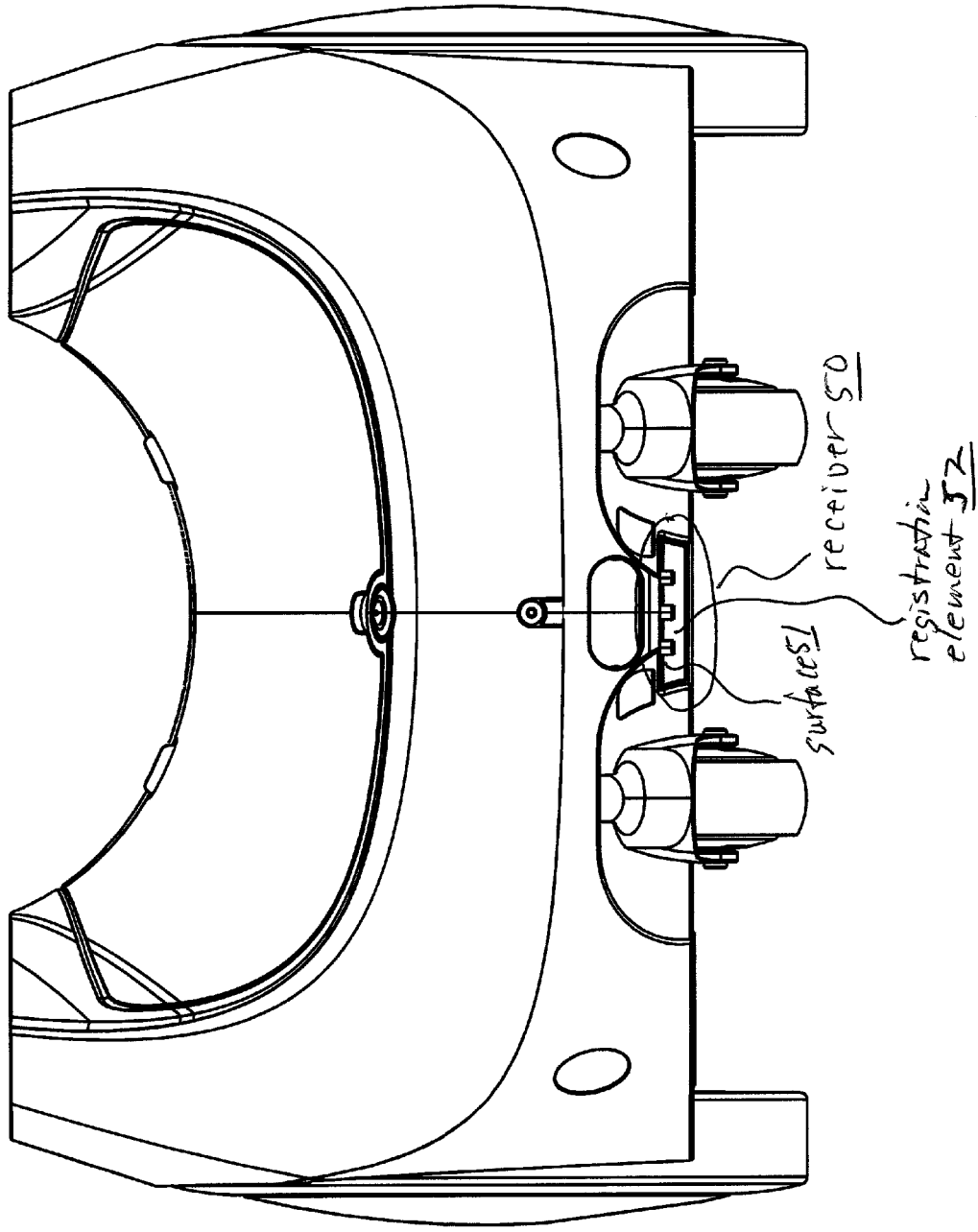

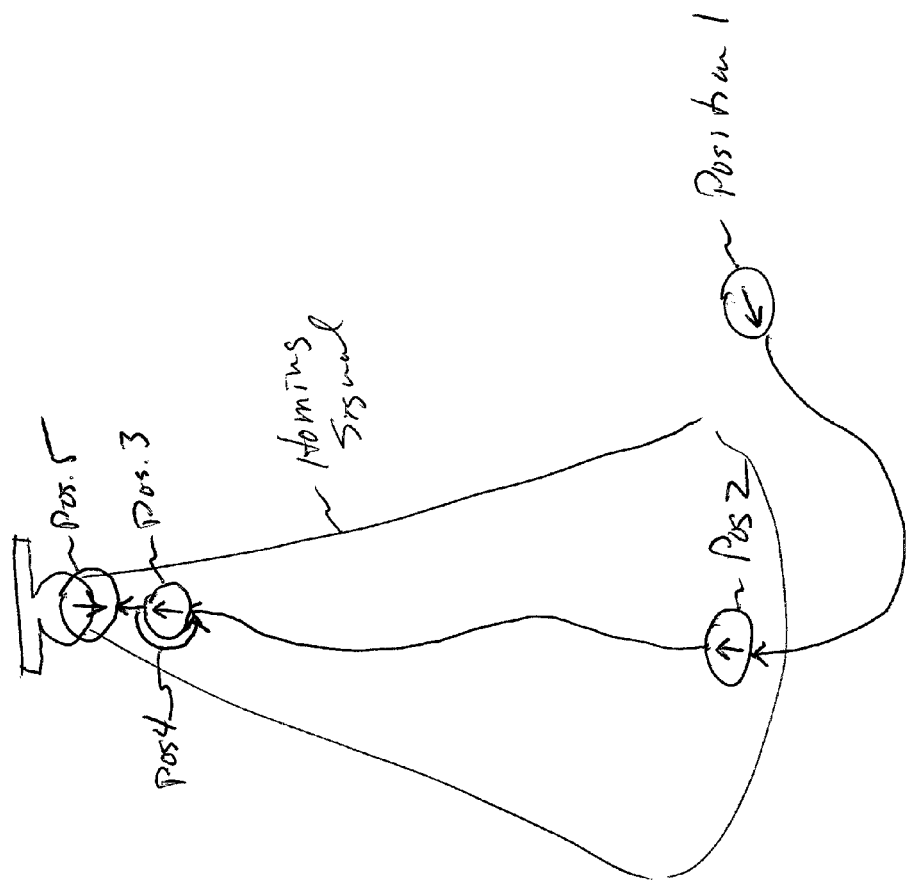

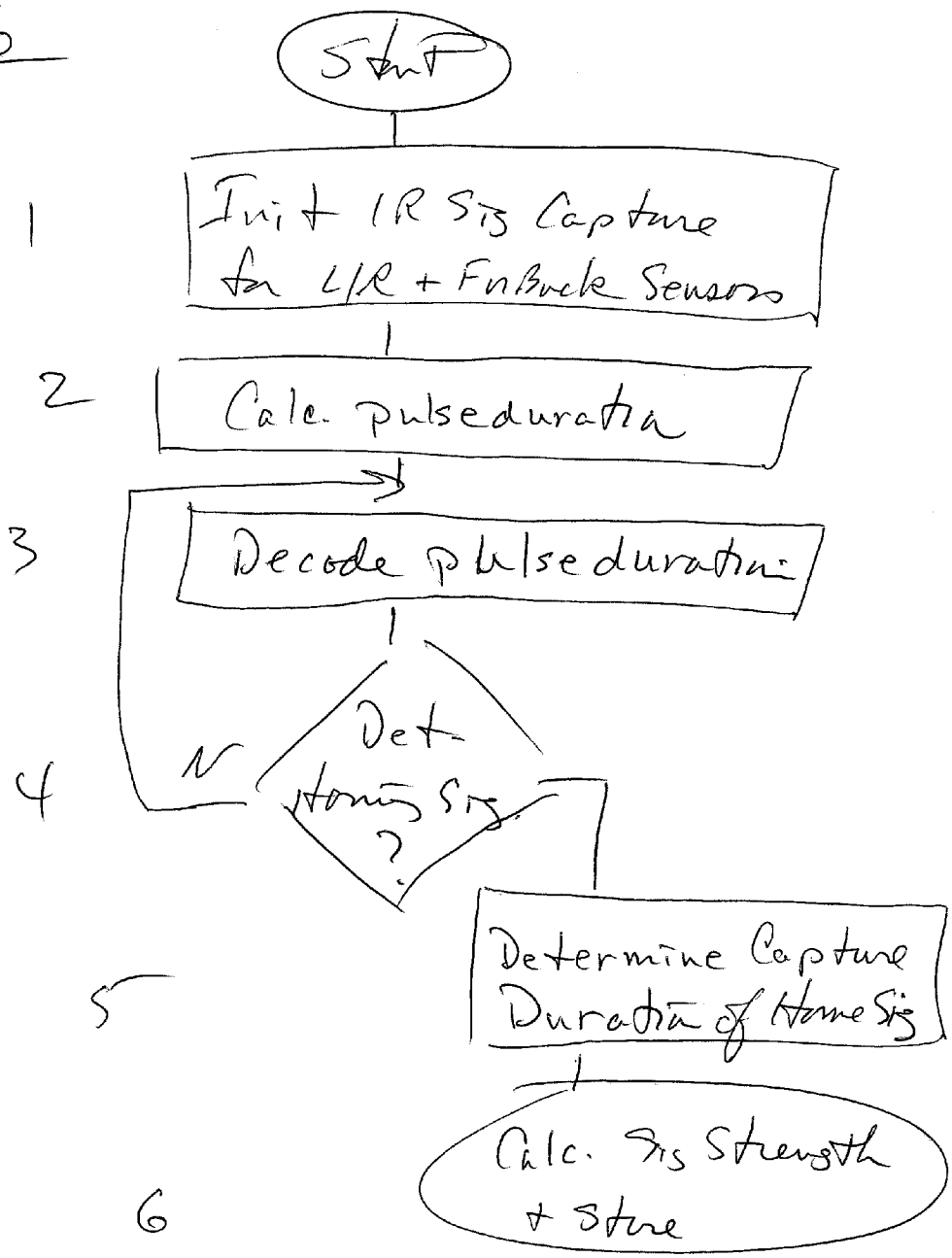

METHOD AND APPARATUS FOR DOCKING A ROBOTIC DEVICE WITH A CHARGING STATION

FIELD OF INVENTION

The invention relates generally to the area of mobile robotic devices suitable for remote communication, and specifically to methods for docking such devices with a charging station.

BACKGROUND

Mobile robotic devices can be designed to perform many different types of functions. They can be designed to perform audio and/or video communication functionality between two or more remote individuals, they can be designed to perform certain tasks such as cleaning, security or safety related tasks, and they can be designed to perform personal health or medical related tasks to name only a few. In order to best perform some of these tasks or functions, the robotic device includes apparatus and functionality that permits the movement to be manually controlled by an individual either remote or local to the robotic device, or that permits the robotic device to perform autonomous movement. Regardless whether this movement is controlled manually or autonomously, it is necessary that the robotic device include some form of power storage device to run the various functions and tasks. Rechargeable batteries are typically used to provide power to the different functions and devices operating on the robotic device. Different upon the size and type of battery, rechargeable batteries are able provide a level of power for longer or shorter periods of time, but all rechargeable batteries eventually need to be connected to a source of DC current in order to be recharged.

Some mobile robotic devices are designed to be manually connected to a source of recharging power, (i.e., an individual can plug a power cord into the robotic device) or it can be designed to be controlled to dock with a battery recharging device, such as a charging station. Typically, such battery charging stations are positioned within the robotic device's environment so that it does not hinder the movement of the robotic device or individuals who share the environment. Some robotic devices are designed so that the entire process of moving to a charging station is manually controlled, some are designed so that the entire process of moving to a charging station is controlled autonomously, and some can combine manual and autonomous movement control. Manual techniques for moving a robotic device to dock with a charging station typically involve the use of a camera mounted on the robotic device through which a remote operator is able to visually detect a charging station, and then use the remote video image to aid in manually controlling the robotic device to move to and dock with the charging station. Other docking techniques use various types of docking signals (IR or radio frequency) that a robotic device detects and used to move towards the charging station. Regardless of the techniques employed, the process of moving a mobile robotic device to a charging station and then properly docking the device with the station so that its battery is recharged is a very important operation that, depending upon the environment in which the robotic device is operating, can be difficult to accomplish successfully.

BRIEF DESCRIPTION OF THE DRAWINGS

FIG. 2C is a block diagram illustrating functionality that can be included in a charging station.

FIGS. 4A and 4B are respectively top and a right side views of a charging station.

FIG. 4D is a lower rear view of the robotic device showing a charging post receiver mechanism.

FIG. 5 is a diagram illustrating positions a robotic device can be in during within its environment during a docking procedure.

FIG. 6 is an logical flow diagram of the homing signal acquisition and quantification process.

DETAILED DESCRIPTION

One problem associated with docking a mobile robotic device with a charging station is the relatively small angle at which the robotic device can approach and connect to the charging station. Typically, the robotic device is required to take an approach path to the charging station that is substantially normal to charging connections associated with a charging station. Some charging stations do have a charging contact connected to a flexible member that permits some variance in the approach path and connection angle, but the approach and connection angles are still relatively small. A problem associated with a mobile robotic device docking system is the cost of IR signal detection components. Devices that both detect an IR signal and measure the signal strength can be relatively expensive compared to devices that only detect an IR signal, such as a homing signal transmitted by a charging station. Novel solutions to these and other problems associated with the design of a mobile robotic device docking system are described herein. A docking system is herein described that permits the angle at which a robotic device approaches a charging station to be relative large, and an inexpensive homing signal sensing system is herein described that detects a homing signal emitted by a charging station and then use certain parameters of the detected homing signal detection to determine a homing signal strength, and then use the homing signal strength to control the direction of movement of the robotic device towards that charging station.

Figure 1:
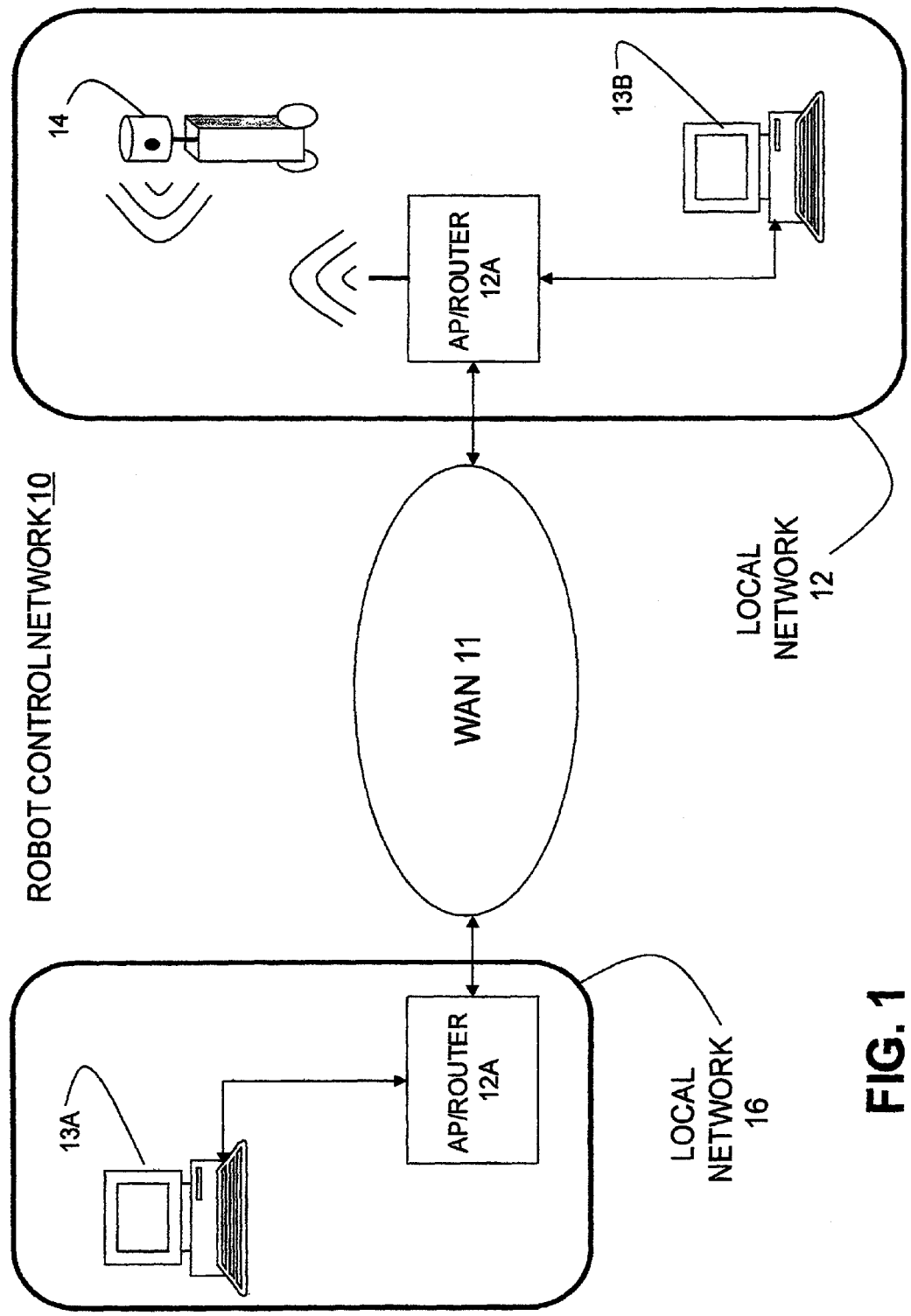
FIG. 1 is a network level diagram showing a mobile robotic device, a charging station, and control devices.

FIG. 1 is a diagram showing a mobile robotic device 14 and two control devices 13A and 13B located in a network 10 configured to support the operation of the robotic device. The network 10 is comprised of two local networks 12 and 16 that are connected to each other over a wide area network 11. Each of the two local networks 12 and 16 can include a respective wireless or wired access point or router 13 and 17 that operate to communicate to the wide area network 11, to communicate with the control devices 13A and 13B and to communicate with the mobile robotic device 14. The wide area network can support traffic formatted according to the well know Internet Protocol or any other protocol suitable for transmitting video, audio and control information between the routers connected to this portion of the network. Each of the local area networks 12 and 16 can be partially wired and partially wireless and each LAN can support traffic formatted according to the well known Ethernet protocol, or any other protocol suitable for transporting information between the device located in each of the two LANs. The wired portion of each LAN can be comprised of the routers and the control devices, and the routers can be wired to the WAN 11 and to the control devices 13A and 13B. LAN 12, for example, can support wireless communication between the router 13 and the mobile robotic device 14. The router and the robotic device can include functionality that supports any one or the many wireless protocols, such as Blue Tooth or the Wi-Fi protocol.

In operation, the robotic device 14 of FIG. 1 can receive video and audio information and control commands from either of the remote control devices, 13A or 13B. Each of these control devices includes functionality that, among other things, operates to support audio and video applications and functionality to generate and send control information to the robotic device. The robotic device 14 generally includes functionality and mechanical elements that permit it to capture audio and video information from its environment and to move around in its environment under the control of an operator using one of the control devices 13A or 13B, or it can operate to move around in its environment in an autonomous manner. In order to move freely around in its environment, the mobile robotic device includes its own power source in the form of a rechargeable battery. The battery is selected to provide power to the robotic device for an extended period of time, typically one day. The battery can provide power to communication applications and equipment, and to the mechanical elements and control to movement of the robotic device within its environment. Periodically, the battery needs to be recharged, and so a charging station can be provided for this purpose that the robotic device can connect to in order to recharge its battery. As described below with reference to FIG. 2C, a charging station includes functionality that enables is to detect whether or not a robotic device has successfully docked with it and it includes functionality that permits it to recharge a battery on the robotic device.

Figure 2A:
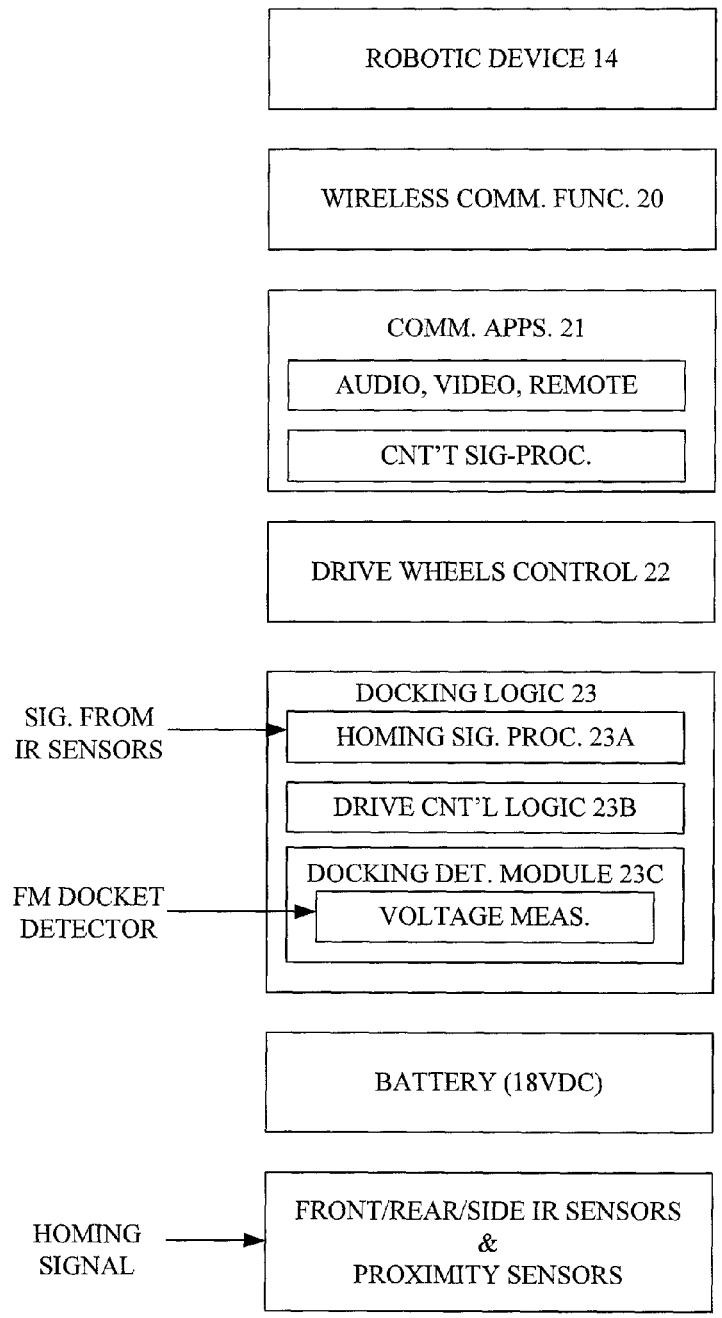
FIG. 2A is a block diagram illustrating functionality that can be included in a mobile robotic device that is used for a docking procedure.

FIG. 2A shows functionality that can be included in the mobile robotic device 14 of FIG. 1 that operates to, among other things, support communication applications, drive control and docking functionality. Wireless communication functionality, such as Wi-Fi, can be included that operates to receive wireless signals from a wireless router or AP described earlier with reference to FIG. 1 that include video, audio and control information. Various communication and control functionality 21 included on the mobile robotic device 14 operate to support video playback, video capture, audio functionality and the processing of robotic device drive control messages. Drive control functionality 22 includes instructions to servo control devices that control the rotation of the drive wheels included on the mobile robotic device. Docking logic 23 is comprised of routine that processes a homing signal emitted by a charging station, a routine that controls wheel drive logic, and a routine to determine whether a robotic device is docked with the charging station. A homing signal processing routine 23A generally operates to capture and decode information included in a homing signal, determine the duration of time each of the two IR sensors detect the homing signal, and then use the duration of capture to determine the strength of the homing signal at each IR sensor. A detailed description of the operation of the homing signal processing routine 23A is included later with reference to FIG. 6. Drive control logic 23B generally operates on the signal strength information generated by the homing signal routine 23A to determine how to control the mobile robotic device's wheel drive functionality. A more detailed description of the operation of the wheel drive control logic is included later with reference to FIG. 7. A docking detection module 23C generally operates to perform resistance measurements between a ground contact and a docking connection contact (described later) located on the bottom surface of the robotic device 14. Depending upon the resistance measured between these points, the module 23C determines that the robotic device has successfully docked or not docked with the charging station. A diagram showing the position of the contacts and a description of their functionality is provided later with reference to FIG. 2D. The docking detection logic 23C periodically sends information to the drive control logic 23B indicating whether or not the robotic device has docked. The drive control function 23B uses this information to control wheel movement of the robotic device.

Continuing to refer to FIG. 2A, the mobile robotic device 14 includes two front and two rear IR sensors. The two front IR sensors are mounted in two separate sensor cavities on the lower front of the robotic device 14 and are separated by approximately 150 mm. The distance separating one front IR sensor from the other is not limiting in this case and can be more or less than 150 mm depending upon a number of factors, such as the position of the IR sensor in the sensor cavity, the shape of the sensor cavity and the material composition of the sensor cavity to name only three. The two rear IR sensors are placed in the same rear sensor cavity and are separated in the cavity by approximately 25 mm. As with the distance between the two front IR sensors, the distance between the two rear IR sensors is not limiting. All four of the IR sensors included in the robotic device 14 are passive devices that only operate to receive IR signal energy, in the form of a homing signal, emitted by the charging station. In addition to the IR sensors, the robotic device 14 also includes at least one front and one rear proximity sensor. These proximity sensors are emitter/receiver devices that operate to emit a signal of a particular wavelength and receive a reflection of the signal. The difference in time between emission and reception of the signal is used to calculate a distance to an object. The proximity sensors are used to detect obstruction or hazards in the robotic device's environment, such as furniture, a downward step or cliff and proximity sensors can be used to detect the charging station.

Figure 2B:
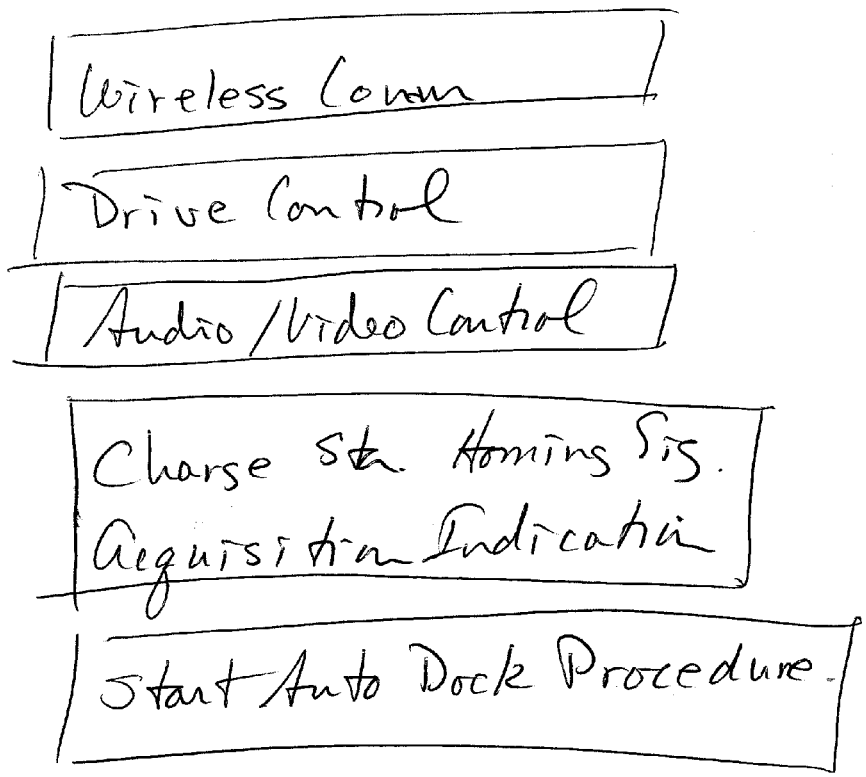
FIG. 2B is a block diagram illustrating functionality that can be included in a device used to control the motion of a mobile robotic device.

FIG. 2B is a diagram showing functional blocks that can be included in a remote control device 25 that is employed to control certain functions included on the mobile robotic device 15. The remote control device includes wireless communication functionality, similar to that included on the robotic device 14, to send and receive wireless signals to and from a base-station such as a wireless router or access point for instance. Functionality is included in the remote control device that permits a remote operator to manually control the movement of the robotic device around its environment. This movement functionality can operate to receive motion control signals from a mouse or joy stick, for instance, and convert these signals to motion control instructions that are sent to the robotic device over the network 10. The remote control device 25 includes an indicator that alerts the operator that the robotic device 14 has acquired a homing signal emitted by the charging station. This indicator can be message or icon that appears on a display associated with the remote control device 25 or it can be an LED that lights up or any other form of indication. When the operator becomes aware that the robotic device 25 has acquired a homing signal from the charging station, and the operator intends to control the robotic device to dock with the charging station, the operator can then initiate an automatic docking sequence by selecting an auto-docking start function that is displayed on the remote control device 25 screen or by depressing a button on the remote control device dedicated to starting the docking sequence. A detailed description of the docking sequence is included later with reference to FIG. 7.

FIG. 2C is a diagram showing functionality that can be included in a mobile robotic device 14 charging station 26. Generally, the charging station 26 operates to emit a homing signal and to recharge a battery included in a robotic device. The homing signal emitted by an IR emitter located on the charging station can be detected and processed by the robotic device, and the resulting processed homing signal information is used to automatically control the movement of the robotic device to dock with the charging station in order to re-charge its battery. The homing signal is generated by a homing signal control module, which can be a pulsed IR source that is programmed to emit a sequence of IR pulses. According to one embodiment, the homing signal is comprised of an initial pulse that serves to mark the beginning of a homing signal, the mark is followed by three pulses that serve to identify a charging station to which a robotic device can connect, and the charging station identification pulses are followed by a homing signal body comprised of a plurality of pulses of equal or unequal lengths which can be detected and captured by the robotic device and used to control the direction and movement of the robotic device during the automatic portion of the docking procedure. Specifically, the body of the homing signal is comprised of a first and a second portion. The first portion of the homing signal is comprised of a plurality of pulses of equal signal strength and the second portion of the homing signal is comprised of a plurality of pulses of decreasing signal strength over time. A first set of one or more pulses comprising the second portion of the homing signal can be transmitted by the charging station at a first power level, a second set of one or more pulses can be transmitted by the charging station at a second power level that is lower than the power level used to transmit the first set of pulses, and so forth until the end of the homing signal. The homing signal is described in more detail later with reference to FIG. 3. The charging station receives AC power from a outlet positioned proximate to the charging station, and the AC power is applied to a DC supply which delivers DC current to the robotic device battery after it docks with the charging station 26.

With continued reference to FIG. 2C, the charging station 26 includes a docking detection device that detects when a robotic device 14 has successfully docked with the charging station. This detection device can be a resistance measuring device that detects the resistance of the robotic device battery (1K-5K ohms ... typically 2K ohms) after the robotic device connects with the charging station. A charging function operates to apply DC current via a charging contact on the charging station to the robotic device 14 battery. This charging function operates in conjunction with the docking detector to apply DC current to the hot contact of the charging station a predetermined amount of time after the docking detector senses the battery load. And finally, the charging station includes a conductive ring that is connected to ground which surrounds the charging contact. When docked, ground and connection detection contacts on the bottom of the robotic device come into contact with the ground ring and a charging contact on the bottom of the robotic device comes into contact with the charging contact on the charging station.

Figure 2D:
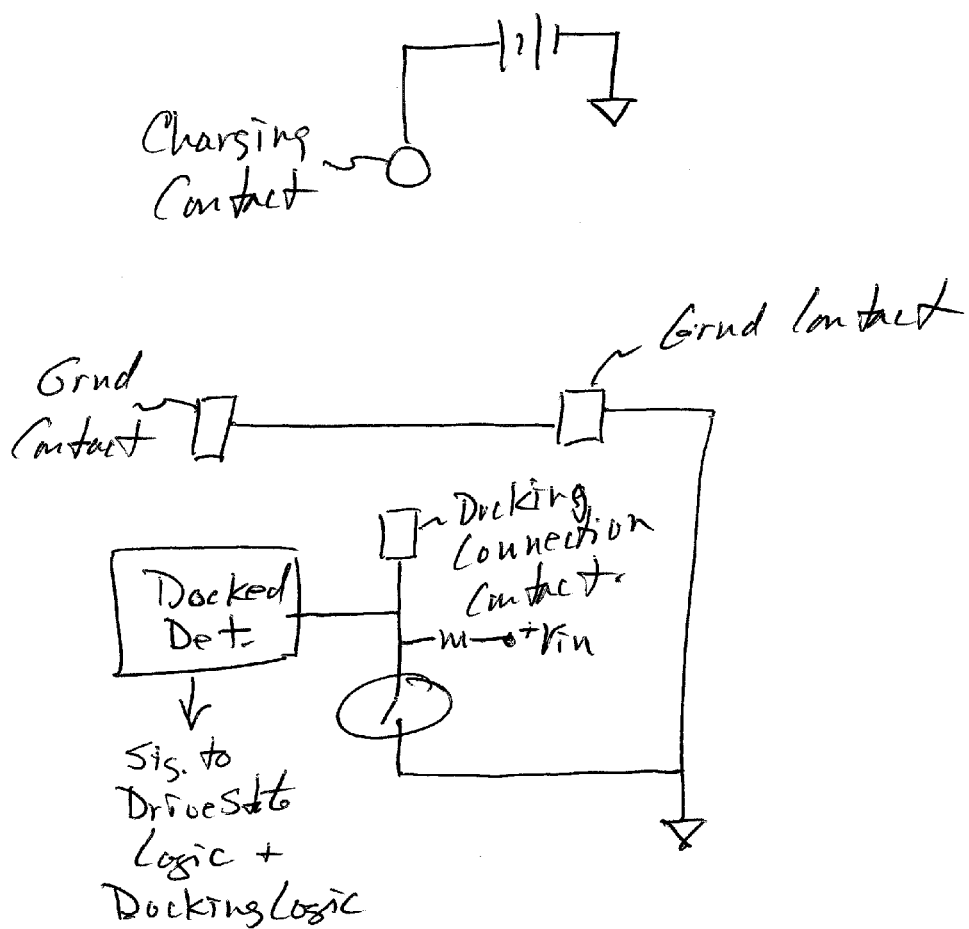
FIG. 2D is a diagram showing docking contacts included on the robotic device.

FIG. 2D is a diagram showing three docking contacts and one battery charging contact included on the bottom of the robotic device 14. In order for the robotic device battery charging operation to proceed, at least two of the docking contacts (either one of two ground contacts and the docking connection contact) need to physically contact the ground ring located on the charging station. In part, due to the geometry of the ground ring and depending upon the number and orientation of IR homing signal emitters located in the charging station, the robotic device is able to successfully dock with the charging station over a wide range of angles. In one embodiment, the robotic device is able to dock with the charging station over a range of sixty degrees, and in another embodiment, the robotic device can successfully dock with the charging station of a range of three hundred and sixty degrees.

As shown in FIG. 2D, both of the ground ring contacts on the bottom of the robotic device are electrically tied to each other and to a robotic device ground reference, and the docking connection contact is connected threw a resistance (10 KOhms for example) to a bias voltage +Vin. Also connected o the docking connection contact is a voltage measuring device which measures the potential across the resistance. When the robotic device is docked with the charging station, the charging contact on the robotic device comes into contact with the charging contact on the charging station 27 and DC current is permitted to flow to the battery on the robotic device. The two ground contacts, the docking connection contact and the resistance measuring device(s) cooperate to detect when the robotic device is docked with or is not docked with the charging station. In the undocked state, the docking detector measures the +Vin across the resistance. On the other hand, when the robotic device is docked with the charging station, the grounding contacts are electrically connected to the docking connection contact, and since the grounding contacts are tied to the robotic device reference, the docking connection contact is also then tied to the same reference and so the docked detector measures this reference level. When the docking detector measures the robotic device reference level, it can generate and sends a signal to the drive logic indicating that the robotic device is docked. At the point in time that the robotic device drive logic receives a signal indicating that the robotic device has successfully docked with the charging station, the drive logic causes the robotic device to immediately stop moving. Further, the three docking contacts operate together to prevent the robotic device from automatically undocking with the charging station in the event of the charging station ceases supplying DC voltage to its charging contact 44. More specifically, if the robotic device is no longer receiving DC current from the charging station, it could believe that it is not longer docked with the charging station and attempt to re-dock by moving away from the charging station and then performing another docking procedure. The presence of the dock connection contact prevents this from occurring.

Figure 3:
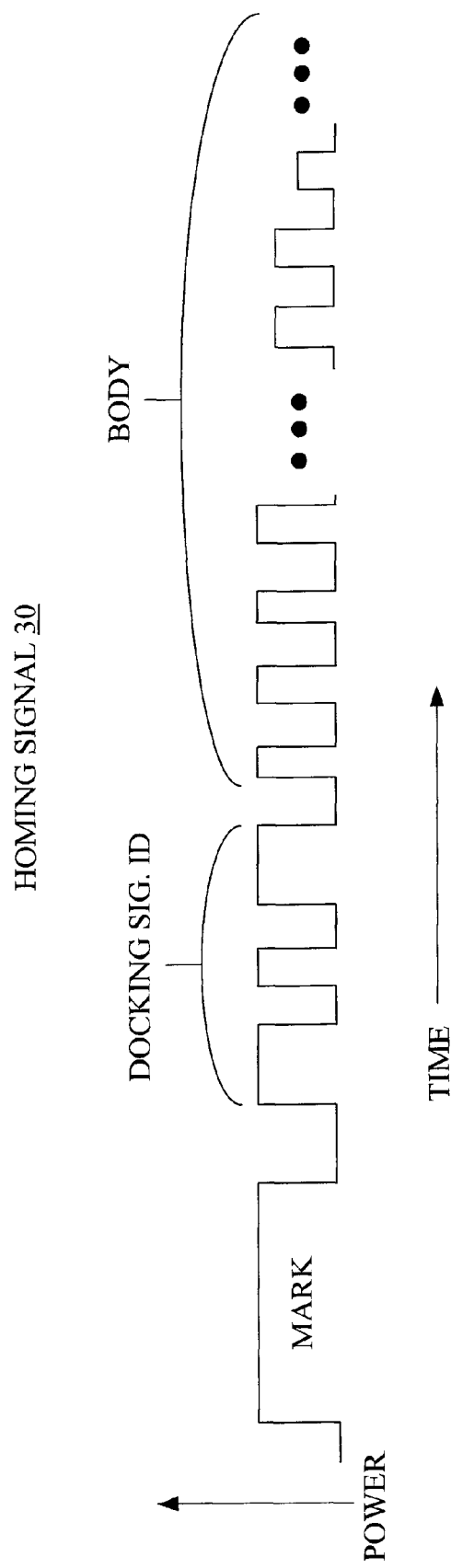
FIG. 3 is a diagram illustrating the format of a homing signal.

FIG. 3 is a diagram of a homing signal 30 that is emitted by the IR emitter 46 included in the charging station 26. As described earlier, the homing signal is comprised of three distinct sections, a first section is comprised of an initial pulse that serves to mark the beginning of a homing signal, the mark is followed by a second section comprised of three pulses that serve as a code to identify a charging station to which a robotic device can connect, and the second section is followed by a third section of the homing signal this is comprised of a plurality of pulses that form the body of the homing signal. The pulses comprising the homing signal 30 are specified to be of varying durations "T", with the duration "T" being equal to five hundred seventy six (576) microseconds. In one embodiment, the duration of the initial mark pulse in the first section of the homing signal 30 is specified to be in the range of seven T to fourteen T (7×T-14×T) in duration (nominally 12×T). The second section of the homing signal is comprised of a three pulse sequence that is decoded to (2-0-2). The first pulse in the sequence is specified to be between 5×T and 7×T in duration (nominally 6×T) and is defined to decode to a value of two (2), the second pulse in the sequence is specified to be between 1×T and 3×T (nominally 2×T) and is defined to decode to a value of zero (0), and the third pulse in the three pulse sequence decodes to be another two (2). The third section comprising the body of the homing signal can include multiple sets of pulses, with each set being comprised of a one or more pulses each pulse of which decodes to the same value or different values. In the embodiment of FIG. 3, the third section of the homing signal 30 is comprised of four sets of four pulses each, with all of the pulses specified to be between 3×T to 5×T in duration which is defined to decode to a value of one (1).

Continuing to refer to FIG. 3, the mark pulse comprising the first section of the homing signal 30 can be transmitted by the IR emitter in the charging station 26 at a power level of sixty milliWatts, the three charging station identification pulses comprising the second section of the homing signal can be transmitted at a power level of sixty milliWatts, each of the four pulses included in the first set of pulses comprising the body of the homing signal can be transmitted at a power level of sixty milliWatts, each of the four pulses included in the second set of pulses can be transmitted at a power level of 40 milliWatts, each of the four pulses included in the third set of pulses can be transmitted at a power level of twelve milliWatts, and each of the four pulses included in the fourth set of pulses comprising the body of the homing signal 30 can be transmitted by the IR emitter in the charging station at a power level of two and one-half milliWatts. A homing signal is transmitted by the IR emitter in the charging station ten times each second and each homing signal can be from 30-50 msec in length.

The propagation characteristics of the pulsed IR homing signal 30 described with reference to FIG. 3 above is dictated by the physics of light waves, and as such, the homing signal is best detected by an IR sensor on a robotic device when there is an unobstructed, clear line of sight between the IR emitter and the IR sensor. Although a reflected or refracted IR signal may be detected by the IR sensors, homing signals with the strongest detected signal strength or power will always be those that an IR sensor receives directly (not reflected or refracted and with a minimum of obstructions) from an IR emitter located on a charging station. Some IR sensors have the ability to capture an IR signal and to process the signal to determine its strength. Other IR sensors have the ability to capture and IR signal but not to process the signal to determine its strength, as the strength of the signal may not be important for the application in which it is used. For instance, a TV has an IR sensor to capture the IR signal transmitted by a remote control device, but the TV does not need to know the strength of the remote IR signal, it either receives the signal or not. However, for applications such as automatically controlling the motion of a robotic device to dock with a charging station, it becomes necessary to detect the strength of an IR homing signal. IR sensors that capture and detect the strength of an IR signal can be expensive, and so it was discovered that the duration of time that the homing signal 30 is detected can be used to indirectly determine the strength of the homing signal. Depending upon the orientation of a robotic device (such as the device 14 described in FIG. 2A) with respect to an IR emitter transmitting a homing signal, such as the homing signal 30, an IR sensor housed in the robotic device may capture some or all of the homing signal. For instance, if the robotic device 14 is oriented such that one or the IR sensors is further away from the source of the homing signal 30 than the other IR sensor (i.e., the robotic device 14 is turned at some angle away from a direct line running between it and the source of the homing signal), it is likely (due to the positioning of the IR sensors in the sensor cavity) that the IR sensor closest to the source of the homing signal will detect the homing signal for a longer period of time (duration) than the IR sensor that is further away. This different in detection time is primarily due to the decreasing power with which each sequential set of four IR pulses comprising the body of a homing signal 30 is transmitted. Although the pulse sets transmitted at the sixty and forty watt power levels may be captured by both IR sensors in the robotic device 14 (this due to the more powerful signal being reflected/refracted within the IR sensor cavity and detected by the sensor) regardless of the robotic devices orientation, it is less likely that reflections or refractions (within the IR sensor cavity) of the pulse sets transmitted at the lower power levels (twelve or two and one-half milliWatts) will be detected by the IR sensor. The farther the robotic device is turned away from a straight line running from it to the IR emitter located in the charging station 26, the shorter the duration of time is that that IR sensor farthest from the IR emitter will detect the homing signal. It is this duration of time during which each sensor captures the homing signal that is used to calculate the strength of the homing signal at each IR sensor. And the difference in calculated signal strengths between each of the two sensors included in the robotic device 14 is used to automatically control the motion of the robotic device to dock with the charging station 26. The procedure that is used to initially position the robotic device 14 to detect, store and use information about the stored homing signal 30 calculate a signal strength is described in detail later with reference to FIG. 6, and the method employed to use the signal strength calculations to control the motion of the robotic device 14 to automatically dock with the charging station is described later with reference to FIG. 7.

Figure 4A:
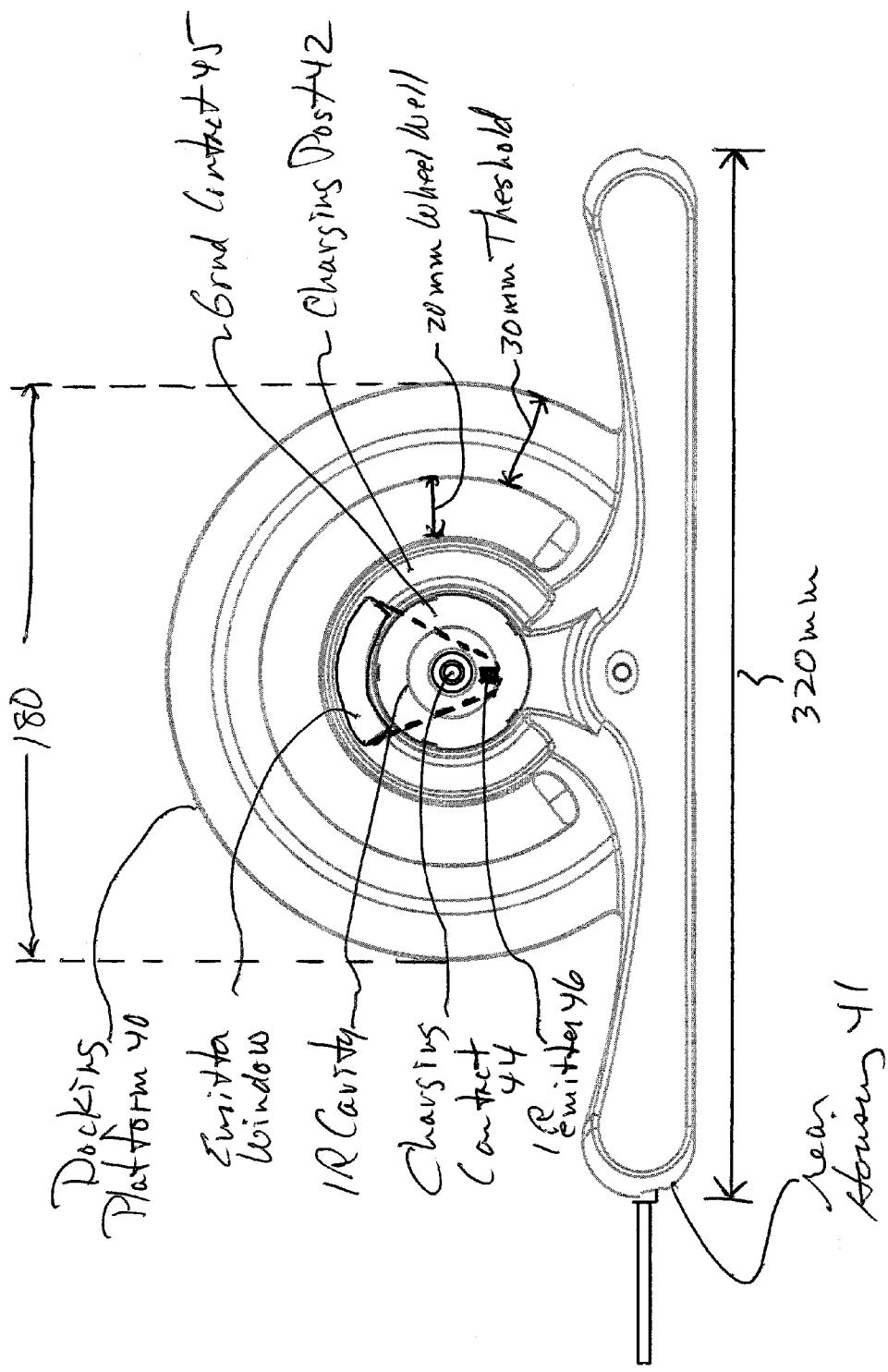

Returning to a description of the docking apparatus employed in one embodiment, FIG. 4A is a top view of an embodiment of the charging station 26 described earlier with reference to FIG. 2C. Charging station 26 is comprised of a circular shaped docking platform 40 connected to an elongated charging station housing 41. The docking station platform 40 is comprised of a circular charging post 42, a circular threshold element at the outer edge of the platform 40, and a circular depression element (wheel receiver) proximate to the threshold for receiving the rear non-driven wheels of the robotic device 14. The circular threshold element extends from the outer circumference of the docking station platform 40 towards the charging post 42 for a distance of approximately 30 mm. The function of the circular threshold element will be described later with reference to FIG. 4D. The rear wheel receiver element function to positively retain the robotic device in place over the charging post 42 so that the orientation of charging contacts on the robotic device and on the charging station is not easily changed. The circular charging post 42 is comprised of a DC charging contact 44, a circular ground contact ring 45 and a homing signal IR emitter 46 that is mounted in a cavity behind an IR emitter window 47. The DC charging contact 44 can be spring loaded and so depressible from a non-docked, fully extended position, and the ground contact ring can be secured to the docking platform in a manner such that it does not move when coming into contact with the docking contacts included on the robotic device 14.

Continuing to refer to FIG. 4A, the docking platform 40 is approximately one-hundred and eighty mm in diameter measured from side to side, the wheel well 43 is approximately 120 mm in diameter and the well 43 is approximately 20 mm in width, and the charging post 42 measures approximately 75 mm in diameter at its base, 52 mm in diameter at its top and is approximately 35 mm in height as measured from the docking platform 40 to the top surface of the charging post 42. As describe above, the width and depth dimensions of the rear wheel receiver depression 43 is designed so as to be sufficient to receive the two rear wheels of the robotic device in such a manner to retain the position of the robotic device's charging contact and docking contacts with respect to the charging stations DC charging contact 44 and the ground ring contact 45 respectively. The charging post 42 also includes at least one IR emitter 46 positioned in a cavity 48 both of which are illustrated with dotted lines. The IR emitter cavity 48 includes a window 47 that can be composed of a material (such as plastic) that transmits IR energy with a minimum of reflection. The front or forward facing dimensions of the IR cavity 48 and IR window 47 and the position of the IR emitter within the cavity are specified so that the IR emitter beam generated by the emitter 46 can be detected by IR sensors included on a robotic device, such as the IR sensors described with reference to FIG. 2A, over range of detection angles approaching ninety degrees. The circular shape of the charging post 42, the ground contact ring 45 and the wheel well 43 and the wide IR beam generated by the emitter 46 advantageously permits a robotic device to dock with the charging station over a wide range of angles, which according to the embodiment illustrated in FIGS. 4A0-4E is approximately sixty degrees.

Continuing to refer to the embodiment of FIG. 4A, the charging station housing 41 is molded into a rear portion of the docking platform 40 such that it occupies approximately ninety degrees of the radius of the rear portion of the docking platform 40. Depending upon the desired range of robotic device docking angles, the station housing 41 can occupy more or less of the docking platform radius. In the embodiment shown in FIG. 4A, a robotic device is able to dock with the charging station 26 over a range of angles that is approximately sixty degrees (plus or minus several degrees). The charging station housing 41 can include, among other things, the DC supply, the homing signal control module, the docking detection device, all of which are described earlier with reference to FIG. 2C, and the housing 41 also includes a charging indicator lamp/LED. In an alternative embodiment, the DC supply, the homing signal control module, and the docking detection device can be included in the docking platform, in which case there may be no need to include the housing 41. The docking station housing 41 measures approximately 320 mm from side to side and its front to back dimensions range from 15 mm to 35 mm. The dimensions of the housing 41 are specified so that the housing is large enough to contain any necessary functionality, which in this case is a DC supply, a homing signal control module and a docking detection device. It should be understood, that the alternative embodiment described above permits a robotic device to approach and connect to the charging station 26 from any angle. In this embodiment, there is no limitation on the angle of approach or connection by the robotic device with the charging station.

FIG. 4A1 is the same top view of the charging station 26 as FIG. 4A, but is addition to the elements described with reference to FIG. 4A, FIG. 4A1 illustrates the angles over which a robotic device, such as the device 14, is able to approach and to dock with the charging station. As shown in FIG. 4A1, the robotic device can approach and dock with the charging station over a wide range of angles, which in this embodiment ranges from zero degrees to thirty degrees to the right and left of the angle which is normal to the charging station, or zero degrees. The only limitation to the docking angle is the width of the homing signal beam emitted from the IR emitter positioned in the IR emitter cavity in the charging station. In other embodiments, the charging post 42 can include multiple IR emitter cavities so that the homing signal beam can be detected by the robotic device over a range of angles from zero to three hundred sixty degrees with respect to the charging station 26. In this case, the rear housing 41 would not be attached to the docking platform (may not be needed) and an AC voltage supply cord could run along the surface of the floor on which the station 26 rests to an AC outlet located in a wall.

FIG. 4B is a right-side view of the charging station 26 illustrated in FIG. 4A. This view shows many of the elements described with reference to FIG. 4A, and it shows the top of the charging contact 44 being above the topmost surface of the charging post 42. The curved, dotted lines extending down from the charging contact 44 below the topmost surface of the charging post 42 are included to illustrate that the contact 44 can extend below the topmost surface of the charging post 42. A proximal end of a leaf spring 49 or alternatively a coil spring is attached to the bottom of the charging contact 44 and a distal end of the leaf spring is secured to either interior charging post 42 structure or interior station housing 41 structure. The charging contact 44 is generally rounded in shape on the top portion that protrudes above the top surface of the charging post 42 and is approximately 15 mm in diameter. The rounded shape of the charging contact 44 permits the robotic devices charging contact to easily depress the charging contact 44 and so to make positive electrical contact.

The docking platform 40 portion of the charging station 26 illustrated in FIG. 4B measures approximately 5 mm from its top surface to its bottom surface. This threshold dimension as well as a gradual incline from the docking platform perimeter to the wheel well, allows the rear, non-drive wheels of a robotic device to easily move onto the platform and be received and retained by the wheel well receiver depression 43 (not shown in this view). The threshold height also serves to lift the rear of the robotic device upward so that a charge post receiver on the bottom of the robotic device clears the top of the charge post 42 as the robotic device connects to the charging station 26. In this view, it can be seen that the charging post 42 is molded to the top of the docking platform 40, and in profile, the sides of the charging post 42 can be seen extending up from its base to its top at an angle over substantially the entire height dimension of the charging post 42.

Figure 4C:
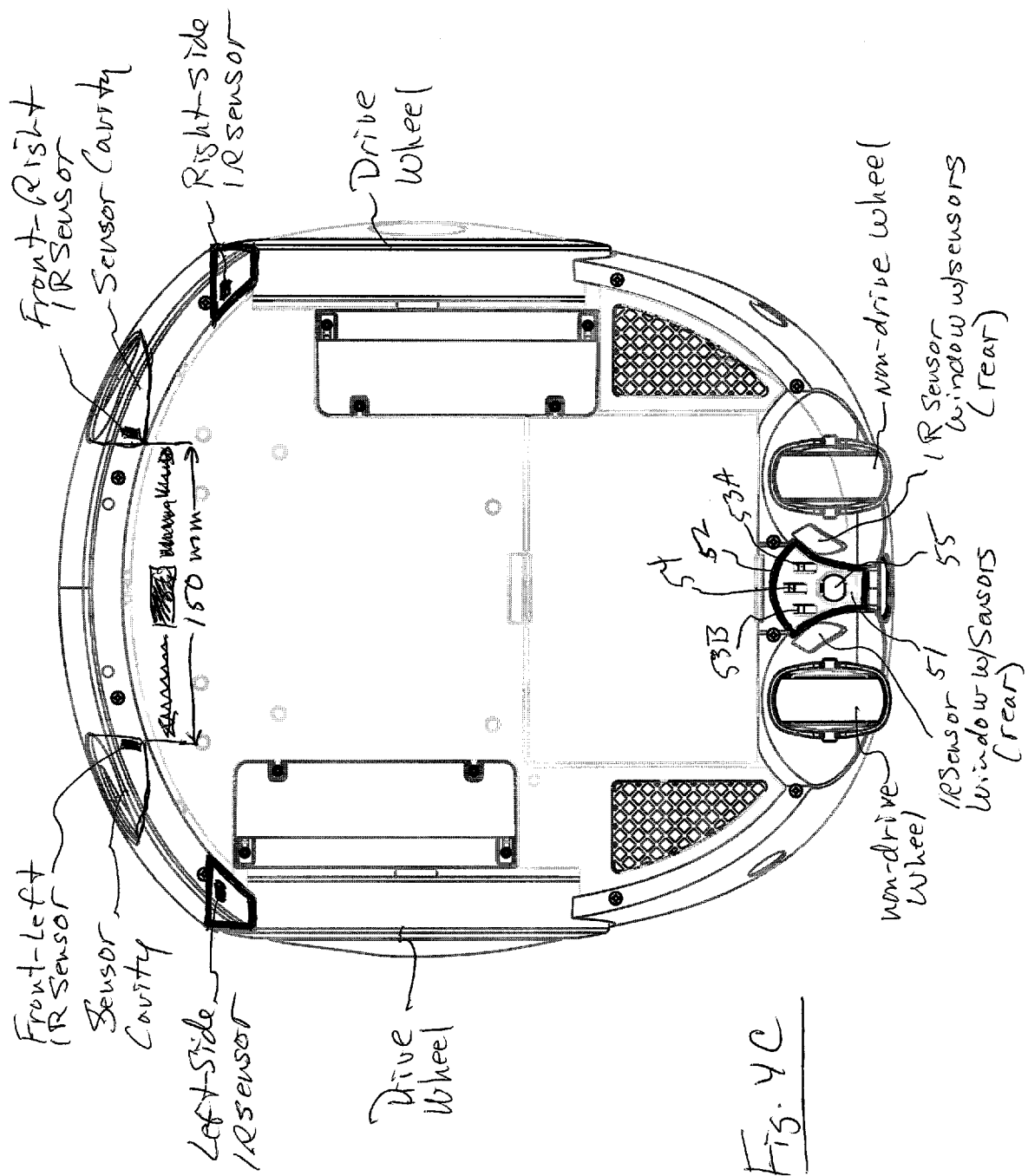
FIG. 4C is a rear view of a lower portion of the robotic device.

FIG. 4C is a view of the bottom of a mobile robotic device body, such as the device 14 described with reference to FIG. 2A. Among other things, this view shows the positions of three sets of IR sensor cavities with respective IR sensors and cavity windows positioned therein. Shown are two front IR sensors, two side IR sensors and two rear IR sensors. As previously described with reference to FIG. 2A, the distance between the left-front and right-front IR sensor cavities is approximately 150 mm, and each of the IR sensors are placed proximate to the rear, inward wall of each IR sensor cavity. The placement of each IR sensor aids in the control of the directional movement of the robotic device during the time it is performing an automatic portion of a docking process while detecting the homing signal. This view of the bottom of a robotic device body also illustrates the position a left and a right driven wheel and a left and a right rear, non-driven wheel and the position of a charging post receiver mechanism 50 that functions to correctly position (register) the various docking contacts and the charging contact over the charging post 42 of FIGS. 4A and 4B. The charging post receiver mechanism 50 is comprised of a docking contacts surface 51 that is positioned in a horizontal orientation between the two rear non-drive wheels and is approximately 35-40 mm above a surface over which these wheels travel. The contacts surface 51 includes two ground contacts 53A and 53B, a connection contact 54, and a charging contact 55 the functions of which have been described previously with reference to FIG. 2D. Each of the two ground contacts 53A and 53B and the docking connection contact 54 can be spring loaded so that they can make positive electrical contact with the ground ring contact 45 described earlier with reference to FIG. 4A. The receiver 50 also includes a charge post registration element 52 which functions to receive the charge post 42 during a docking procedure and to correctly register the docking contacts and charge contact over the charging post ground ring 45 respectively. The registration element 52 is a semi-circular surface that extends vertically downward from the rear of the contact surface 51 approximately 5 mm and comes into contact with the top of the charging post 42 during the docking process. The dimensions (diameter) of the radius of the registration element 52 are substantially the same as the dimensions of the circular charging post 42 to permit the charging post to positively register with the registration element 52 during the docking process. So for instance, if during the final portion of the docking process, when the robotic device 14 is moving in reverse to make contact with the charging station 26, and the position of the robotic device receiver mechanism 50 with respect to the charging post 42 on the charging station 26 is not correct (misaligned), the receiver 52 functions to mechanically correct for this misalignment. FIG. 4C also shows the position of the rear proximity sensor in a proximity sensor cavity as described earlier with reference to FIG. 2A.

FIG. 4D is a lower rear view of the robotic device showing the charging post receiver mechanism 50 and several of its component parts, such as the surface 51 and the registration element 52.

Figure 4E:
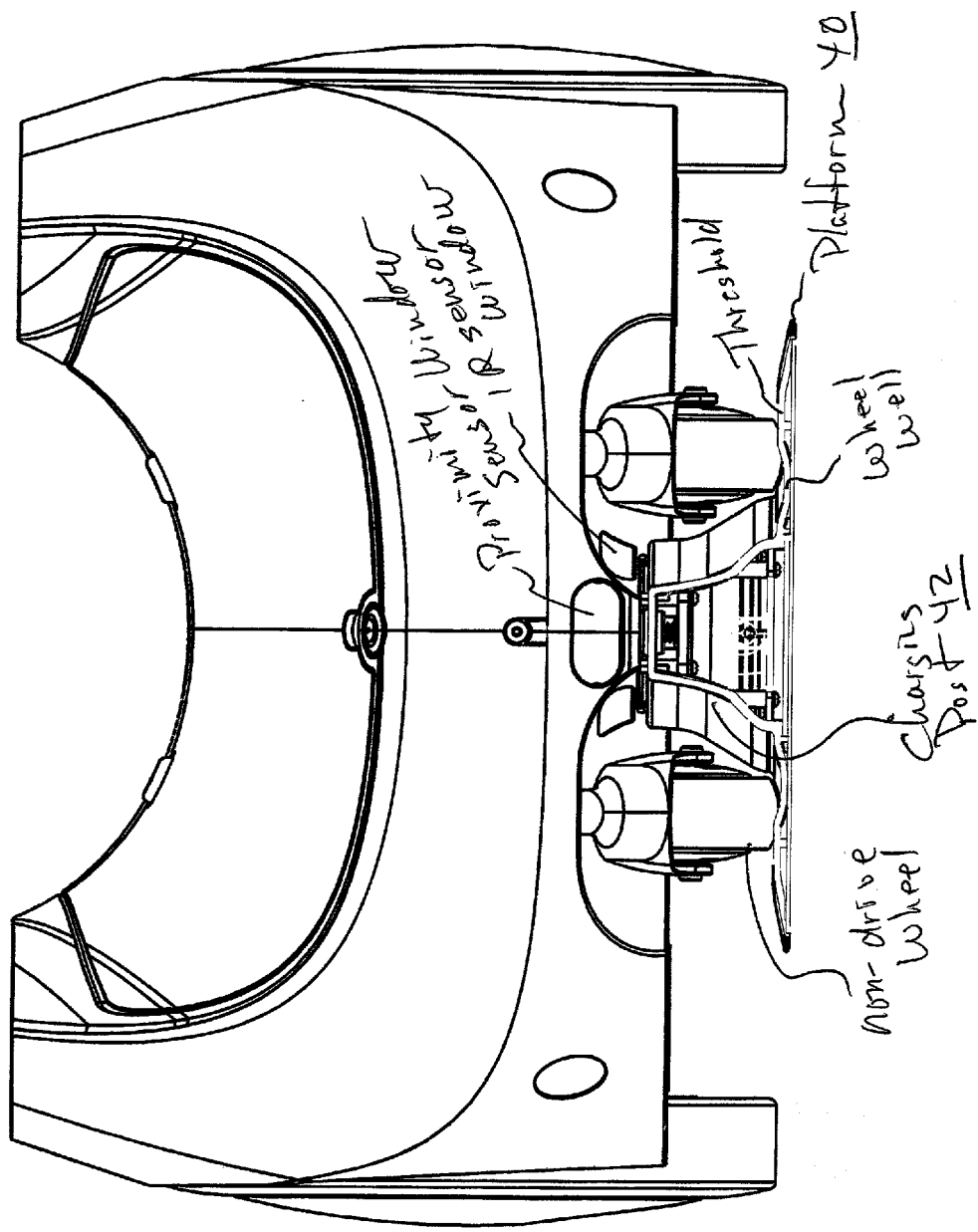
FIG. 4E is a rear view of the lower portion of the robotic device docked with the charging station showing a cross section of a charging post and station platform.

FIG. 4E is a rear view of the lower portion of a robotic device, showing some of the elements described above with reference to FIG. 4C, and a cutaway view of the docking platform 40. The driven and the non-driven wheels are illustrated as well as the two rear IR emitter cavity windows and the proximity sensor cavity window. Also shown are the ground contacts, the docking connection contact and the charging post receiver described earlier with reference to FIG. 4C. In operation, the robotic device moves in a reverse direction onto the docking platform 40. The rear wheels of the robotic device first come into contact with and move over the threshold which raises the rear of the robotic device, including the charge post receiver 50. The robotic device continues in the reverse direction until it determines that it has successfully docked with the charging station. At this point, the rear wheels of the robotic device rest in the wheel well and the charge post receiver 50 moves in a downward direction so that the charging contact 55 on the robotic device and the charging contact 44 on the charging station 26 make good electrical contact. This downward motion also effects good electrical contact between the ground and connection contacts, located in the receiver element on the bottom of the robotic device, with the ground contact (ring) 45 located on the top of the charge post 42.

It should be understood that while certain elements of the charging station 26 and robotic device 14 embodiments referred to in FIGS. 4A-4E are described as having particular dimensions, these dimensions are not limiting and are for descriptive purposes only.

The general procedure followed to control the robotic device 14 to dock with the charging station 26 includes a number of distinct phases. The positions of the robotic device in its environment relative to the charging station during each of these distinct docking phases are illustrated in FIG. 5 and will now be described. After a remote operator realizes that the battery on the robotic device 14 needs to be recharged, the operator can manually control the robotic device to move from an initial position 1 to a next position 2 that is within range of the homing signal 30 emitted by the charging station 26. The operator typically knows where the charging station is and so uses video information captured by the camera (any type of device capable of capturing real time video information) on the robotic device and displayed on the remote control device to locate the charging station. Optionally, if the operator knows that the robotic device is already in the same room as the charging station but is not able to visually locate the station, they can command the robotic device to spin three hundred and sixty degrees while sensing (using the front IR sensors) for the presence of the homing signal. The direction from which the strongest homing signal strength is received is likely to be the direction in which to move the robotic device to dock with the charging station. Regardless of the technique used to find the charging station, the operator can continue to manually control the movement of the robotic device until at least one of the front IR sensors captures at least a portion of a homing signal such as the homing signal 30 described earlier with reference to FIG. 3. At the point that at least one IR sensor on the robotic device captures at least a portion of a homing signal, the robotic device is at position 2. At this point the operator can elect to run an automatic docking function or to attempt to manually dock the robotic device with the charging station.

Continuing to referring now to FIG. 5, and assuming that the automatic docking routine is selected, homing signal information captured by one or both of the sensors on the robotic device is processed and the results are used to control the movement of the device towards the charging station. The robotic device moves from position 2 towards the charging station until its front IR sensors can no longer detect the homing signal and then stops at position 3. This inability to detect a homing signal is primarily due to the placement of the front IR sensors within each of the IR sensor cavities in the robotic device and the angle at which the homing signal strikes the sensor cavity. After having arrive at position 3 and stopping, the robotic device starts spinning around in place and at the same time starts processing IR signal information captured by the two rear IR sensors. The robotic device will spin approximately one hundred and eighty degrees and during this spinning motion it will start processing IR signal information captured by the rear IR sensors and disregard and IR signal information captured by the front sensors. At the point that the homing signal processing logic 23A on the robotic device determines that both of the rear IR sensors have captured the homing signal, and the drive control logic 23B determines that the robotic device has completed its approximately one hundred and eighty degree spin, the device is now in position 4, at which time is will stop spinning. After reaching position 4 the robotic device will slowly move in reverse towards the charging station using homing signal information captured by the rear IR sensors to control the devices drive motion. At a point very close to the docking station the proximity sensor positioned in the rear of the robotic device detects platform 40 and the robotic device continues to move in reverse without using the homing signal information to control its movement. The robotic device stops at position 5 when the docking detection module 23C determines that the robotic device is successfully docked with the charging station. At this point the charging station 26 can apply DC current to its charging contact.

We now turn to a description of the operation of the homing signal processing functionality 23A included in the docking logic 23 of the robotic device 14. Homing signal processing logic 23A generally operates to capture IR signal information at the left and the right IR sensors (both front and back) and to process the information to determine whether the signal is noise or a homing signal, and then to determine how long each of the sensors is able to capture the homing signal information (capture duration). The duration information is then employed to calculate the homing signal strength detected at both of the sensors. FIG. 6 is a logical flow diagram of the operation of the homing signal processing logic 23A. In Step 1, the edge capture logic for the front left and right IR sensors is initiated if the robotic device is moving in the forward direction and the logic for the rear left and right IR sensors is initiated if the robotic device is moving in the reverse direction. The IR signal information that is captured in Step 1 is the time of capture of the rising and falling edges of IR pulses. Edges that are below a specified power level are not captured. In Step 2, the IR signal information captured in Step 1 is used to calculate the duration of each pulse (time different or Delta between the rising and falling edge of a pulse) and this pulse duration information is then stored. In Step 3, pulse duration information calculated in Step 2 is decoded to determine whether the pulse represents a noise, a mark, a zero, a one or a two. The decoded pulse durations are used in Step 4 to determine whether a homing signal has been detected (detects mark and three pulse signal ID), and if so, in Step 5 the start of the homing signal is identified and the length of time that the homing signal is detected (capture duration) is determined. On the other hand, if in Step 4 it is determined that a homing signal has not been detected, the process returns to Step 3. Returning to Step 5, after the capture duration for a homing signal for both the left and right IR sensors is determined, in Step 6 this capture duration information is used to calculate a homing signal strength for both the left and the right IR sensors and this signal strength is stored for use by the drive control logic 23B described earlier with reference to FIG. 2A.

Figure 7:
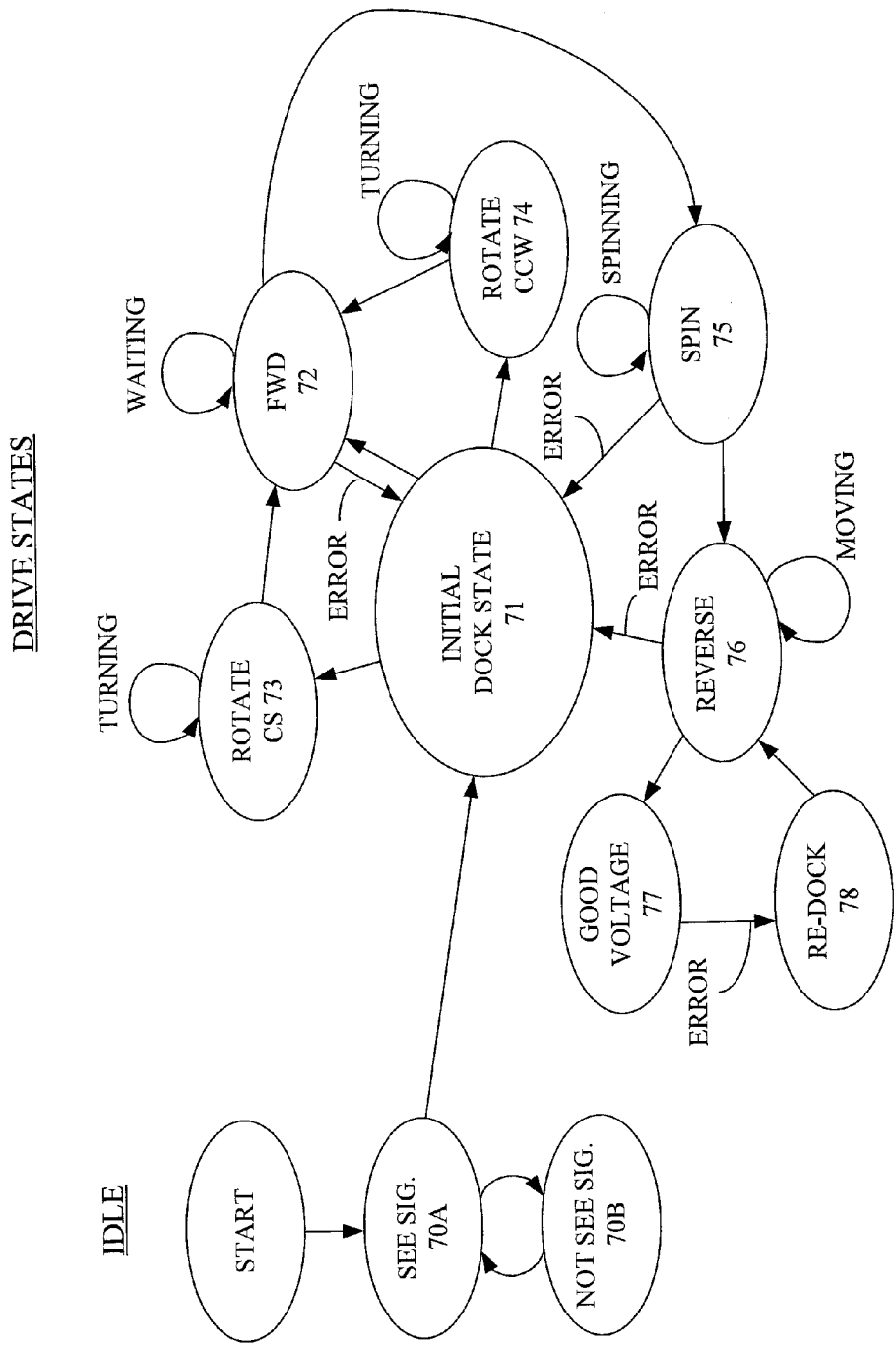
FIG. 7 is state diagram illustrating the various states used to control the mobile robotic device motion.

The homing signal strength information stored in Step 6 of FIG. 6 is used to control the transitions between drive control states as will now be described with reference to FIG. 7. Generally, FIG. 7 illustrates the various drive control states implemented in the drive control logic 23B of FIG. 2A. The drive control states can be separated into two drive control state groups, a first group is comprised of drive states in which the robotic device 14 is not moving or is "idled" and a second group is comprised of drive states in which the robotic device can be moving. Starting with the first group, after the robotic device 14 is powered and operational and assuming that it is being controlled to dock with the charging station 26, at the point that at least one of the IR sensors in the robotic device detects a homing signal, the see signal state 70a is entered. The robotic device can transition to the not see signal state 70B in the event that the robotic device moves in a way such that the homing signal is not longer detected, in which case it can be controlled to move to a position in which it can again detect the homing signal and transition back to the see signal state 70A.

Continuing to refer to FIG. 7, while in the see signal state 70A, the robotic device operator can select functionality that initiates an automatic docking procedure where upon the next state labeled initial dock state 71 is entered. Once in the initial dock state 71, the drive control logic 23B can directly transition to three other states. It can transition to a state 72 that controls the forward movement of the robotic device, it can transition to a state 73 that controls the clock-wise (CW) rotational movement of the robotic device and it can transition to a state 74 that controls the counter clock-wise (CCW) rotational movement of the device. When in the initial dock state 71, if both the front left and front right IR sensors detect a homing signal, the drive control logic 23B transitions to the forward state 72. While in the forward state 72, the movement of the robotic device can be controlled by the drive control function 22 to move in a generally forward direction. The movement can be straight line movement or can be forward movement to the right or to the left depending upon the homing signal strength detected in the two front IR sensors. The drive control logic 23B transitions from the initial dock state 71 to either the CW state 73 or CCW state 74 respectively if only the right IR sensor or the left IR sensor detects a homing signal. While in either the CW or CCW states, the robotic device is not being controlled to move in a forward direction, but rather is turning in place to the right or to the left for as many degrees as necessary to acquire a homing signal in both the right and the left from IR sensors. Also, if the drive control logic 23B is in either the CW state 73 or the CCW state 74 and both the left and the right IR sensors detect a homing signal, then the drive control logic transitions to the forward state 72.

With continued reference to FIG. 7, from the forward state 72, the drive control logic can transition to the spin state when both of the front IR sensors are no longer able to detect a homing signal. In the spin state 75, the robotic device stops moving forward, after a specified period of time, the left and the right drive wheels rotate in opposite directions which has the effect of spinning the robotic device in place a specified number of degrees, which in this case is approximately one hundred and eighty degrees. The robotic device remains in state 75 until it rotates one hundred and eighty degrees and both rear IR sensors detect a homing signal. Detection of the homing signal by both rear IR sensors causes the drive control logic 23B to transition to the reverse state 76, and the drive control function 22 operates to drive the robotic device 14 in reverse until the docking detection module 23C on the robotic device 14 determines that the device 14 has successfully docked. While in the reverse state 76, the robotic device uses the homing signals sensed by both the left and right rear IR sensors to control the reverse movement (steering) until the proximity sensor detects the charging station 26. At this point, the drive control function 22 simply controls the drive wheels such that the robotic device moves in reverse in a straight line until it docks with the charging station and enters the good voltage state 77, at which point the robotic device is controlled to stop. A specified time after the drive control logic 23B transitions to the good voltage state 77 and has come to a stop, the drive control function 22 sends three short drive wheel commands (each command is referred to here as a nudge) that cause both of the drive wheels to rotate the same fraction of a rotation three separate times. This "nudging" in a reverse direction ensures that the robotic device is positively docked with the charging station 26.

If, after having successfully docked with the charging station and when the drive control logic 23B is in the good voltage state 77, the robotic device is accidentally moved so that it is no longer in position for its battery to receive the charging current (both charging contact are not touching), the docking detection module 23C comprising the docking logic 23 detects that the robotic device is not longer receiving DC charging current and the drive control logic then transitions to a re-dock state 78. In the re-dock state 78, the robotic device is controlled to move away in the forward direction a specified distance from the charging station and attempt to reacquire the homing signal in both of its rear IR sensors. When both rear IR sensors acquire a homing signal, the drive control logic 23B transitions to the reverse state 76 and attempts to dock with the charging station as before.

Referring back to FIG. 5, if the battery charge on the robotic device is low (below some selected charge threshold) and the operator has started the manual portion of the docking process, but terminates the docking process for any reason, after a per-selected period of time, the robotic device will automatically enter the "start" state described with reference to FIG. 7 and start autonomously roaming around its environment searching for a homing signal. When the robotic device detects the homing signal it will then proceed to the initial dock state 71 and continue to run the process until it successfully docks with the charging station or until an error occurs. In another embodiment, the camera located on the robotic device 14 can be automatically controlled to tilt down so that the charging station 26 can be observed by a remote operator as the robotic device 14 approaches position 3 in the process. Tilting the camera in this manner can be an aid to the operator in the event that the docking process fails. In this event, the operator can manually override the docking procedure and cause the robotic device to attempt another docking procedure. Specifically, as the robotic device approaches position 3, the camera can be controlled to automatically tilt down so that the charging station 26 is in the field of view of the operator. As the robotic device turns to position 4, the camera can be control to tilt so that the charging station continues to be in the camera field, and so forth until the robotic device 14 successfully or unsuccessfully docks with the charging station 26.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A station for charging a mobile robotic device battery, the station comprising:
    a circular shaped platform having an upwardly facing surface connected to a substantially flat downwardly facing surface which rests upon a planar surface, the upwardly facing surface of the circular shaped platform comprising:
        a platform threshold disposing around the entire circumference of the circular shaped platform, the outer circumference of the platform threshold at substantially the same elevation as the planar surface and the platform threshold having an upwardly sloping contour on a radius moving away from the outer circumference of the platform to a maximum threshold height above the elevation of the planar surface;
        a circular wheel well formed in the circular shaped platform, the wheel well is disposed around the entire circumference of the circular shaped platform, is adjacent to and radially inward from the platform threshold and forms a circular depression having a depth and width to positively retain one or more wheels associated with the mobile robotic device;
        a circular charging post disposed centrally to the circular platform having an uppermost, substantially planar surface disposed at an elevation above the maximum threshold height, the charging post having at least one emitter for transmitting a homing signal over a three hundred and sixty degree radius with respect to the circular platform; and
        the circular charging post having power and ground contacts disposed on the top, planar surface of the post to which power and ground connections on the robotic device contact.

2. The charging station of claim 1, further comprising a docking detector for determining that the mobile robotic device is docked with the charging station.

3. The charging station of claim 2, wherein the docking detector operates to apply power to the power contact when it determines that the mobile robotic device is docked with the charging station.

4. The charging station of claim 3, wherein the power is direct current.

5. The charging station of claim 1, wherein the homing signal is an electromagnetic signal emitted in the infrared range of the electromagnetic spectrum.

6. The charging station of claim 1, further comprising an infrared cavity disposed in the circular charging post, the at least one emitter being mounted in the infrared cavity.

7. The charging station of claim 6, wherein the infrared cavity is disposed around the entire circumference of the charging post.

8. The charging station of claim 1, wherein the power connection disposed on the top of the charging post is depressible.

9. A station for charging a mobile robotic device battery, the station comprising:
    a circular shaped platform having an upwardly facing surface connected to a substantially flat downwardly facing surface which rests upon a planar surface, the upwardly facing surface of the circular shaped platform comprising:
        a platform threshold disposing around at least a portion of the circumference of the circular shaped platform, the outer circumference of the platform threshold being at substantially the same elevation as the planar surface and the platform threshold having an upwardly sloping contour on a radius moving away from the outer circumference of the circular shaped platform to a maximum threshold height above the elevation of the planar surface;
        a circular wheel well formed in the circular shaped platform, the wheel well is disposed adjacent to and radially inward from the platform threshold and forms a circular depression having a depth and width to positively retain one or more wheels associated with the mobile robotic device;
        a circular charging post disposed centrally to the circular platform having an uppermost, substantially planar surface disposed at an elevation above the maximum threshold height and the charging post disposing centrally in the circular platform, the charging post having at least one emitter for transmitting a homing signal over at least a sixty degree radius with respect to the circular platform; and the circular charging post having power and ground contacts disposed on the top planar surface of the post to which power and ground connections on the robotic device contact.

10. The charging station of claim 9, further comprising a docking detector for determining that the mobile robotic device is docked with the charging station.

11. The charging station of claim 10, wherein the docking detector operates to apply power to the power contact when it determines that the mobile robotic device is docked with the charging station.

12. The charging station of claim 11 wherein the power is direct current.

13. The charging station of claim 9, wherein the homing signal is an electromagnetic signal emitted in the infrared range of the spectrum.

14. The charging station of claim 9, further comprising an infrared cavity disposed in the circular charging post, the at least one emitter being mounted in the infrared cavity.

15. The charging station of claim 14, wherein the infrared cavity is disposed sixty degrees around the circumference of the charging post.

16. The charging station of claim 9, wherein the power connection disposed on the top of the charging post is depressible.

17. A mobile robotic device battery charging system; comprising:

a charging station with a circular shaped platform having an upwardly facing surface connected to a substantially flat downwardly facing surface which rests upon a planar surface, the upwardly facing surface of the circular shaped platform having a charging post disposed centrally to it, the charging post is cylindrical in shape, has a vertical axis oriented normal to the plane of the circular shaped platform and has an uppermost, substantially planar surface that is disposed at a higher elevation with respect to the rest of the circular shaped platform, the uppermost, planar surface of the charging post having a ground contact ring and a power contact, and the charging post having a homing signal emitter for transmitting a homing signal over at least a sixty degree radius with respect to the circular platform; and a mobile robotic device comprising docking logic, homing signal sensors, and a charging post receiver, the mobile robotic device operable to receive the homing signal transmitted by the homing signal emitter which is used by the docking logic to control movement of the mobile robotic device to dock with the charging station over at least a sixty degree radius with respect to the circumference of the circular platform.

18. The system of claim 17, further comprising the charging station having a docking detector for determining that the mobile robotic device is docked with the charging station.

19. The system of claim 17, further comprising the mobile robotic device having a docked detector for determining that a charging current is flowing to a robotic device battery.

20. The system of claim 19, wherein the docked detector sends a signal to the mobile robotic device docking logic which operates to control the mobile robotic device to immediately stop movement.

21. The system of claim 17, wherein the mobile robotic device receives a homing signal from the charging station when it is positioned at any angle with respect to the three hundred and sixty degree circumference of the charging station.

* * * * *